United States Patent
Eo et al.

(10) Patent No.: US 10,099,681 B2
(45) Date of Patent: Oct. 16, 2018

(54) USER INTERFACE APPARATUS OF NON-UNIFORM DISPLACEMENT ENGINE CONTROL SYSTEM AND CONTROL METHOD OF THE USER INTERFACE APPARATUS OF NON-UNIFORM DISPLACEMENT ENGINE CONTROL SYSTEM

(71) Applicant: HYUNDAI MOTOR COMPANY, Seoul (KR)

(72) Inventors: Jeong Soo Eo, Hwaseong-si (KR); Sung Jae Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 86 days.

(21) Appl. No.: 15/266,622

(22) Filed: Sep. 15, 2016

(65) Prior Publication Data

US 2017/0080922 A1 Mar. 23, 2017

(30) Foreign Application Priority Data

Sep. 17, 2015 (KR) .................. 10-2015-0131356
May 2, 2016 (KR) .................. 10-2016-0054153

(51) Int. Cl.
*B60W 20/15* (2016.01)
*B60W 20/17* (2016.01)
(Continued)

(52) U.S. Cl.
CPC ............ *B60W 20/15* (2016.01); *B60W 10/06* (2013.01); *B60W 10/08* (2013.01); *B60W 20/17* (2016.01);
(Continued)

(58) Field of Classification Search
CPC ...... B60W 20/15; B60W 20/17; B60W 10/06; B60W 10/08; B60W 30/18; B60W 30/20
(Continued)

(56) References Cited

U.S. PATENT DOCUMENTS

| 4,411,230 A | 10/1983 | Lee |
| 5,374,224 A | 12/1994 | Huffmaster et al. |

(Continued)

FOREIGN PATENT DOCUMENTS

| JP | 07-208222 A | 8/1995 |
| JP | 07-229754 A | 8/1995 |

(Continued)

OTHER PUBLICATIONS

Extended European Search Report dated Jan. 26, 2017, issued in European Application No. 15197480.5.

(Continued)

*Primary Examiner* — Yazan A Soofi
(74) *Attorney, Agent, or Firm* — McDermott Will & Emery LLP (57) ABSTRACT

A user interface apparatus for controlling a vehicle comprising a non-uniform displacement engine comprising at least two sizes of cylinders having different displacements, a motor connected to a driving shaft of the engine, and a motor controller for controlling the motor, the user interface apparatus includes an input for selecting a control mode of the non-uniform displacement engine and the motor, an interface controller communicating with the motor controller such that the motor is controlled in the selected control mode, and a display device for displaying information about the selected control mode, wherein the user interface apparatus has a control mode for controlling the motor to compensate for a difference in torque due to different displacements of the cylinders such that a sum of engine (Continued)

torque and motor torque in explosion stroke of each cylinder is uniform.

20 Claims, 10 Drawing Sheets

(51) Int. Cl.
*B60W 10/06* (2006.01)
*B60W 10/08* (2006.01)
*B60W 30/18* (2012.01)
*B60W 30/20* (2006.01)

(52) U.S. Cl.
CPC ............ *B60W 30/18* (2013.01); *B60W 30/20* (2013.01); *B60W 2510/0657* (2013.01); *B60W 2510/244* (2013.01); *B60W 2710/06* (2013.01); *B60W 2710/083* (2013.01); *B60Y 2200/92* (2013.01); *B60Y 2400/61* (2013.01)

(58) Field of Classification Search
USPC .......................................................... 701/22
See application file for complete search history.

(56) References Cited

U.S. PATENT DOCUMENTS

| | | | |
|---|---|---|---|
| 5,437,253 | A | 8/1995 | Huffmaster et al. |
| 5,722,359 | A | 3/1998 | Chubachi et al. |
| 7,240,749 | B2 | 7/2007 | Bhavsar et al. |
| 9,440,640 | B1 | 9/2016 | Pritchard et al. |
| 2002/0116099 | A1* | 8/2002 | Tabata ................ B60K 6/32 701/22 |
| 2004/0012206 | A1 | 1/2004 | Wakashiro et al. |
| 2005/0011690 | A1 | 1/2005 | Bhavsar et al. |
| 2005/0164826 | A1 | 7/2005 | Albertson |
| 2006/0032684 | A1 | 2/2006 | Rayl |
| 2006/0196463 | A1 | 9/2006 | Pallett et al. |
| 2007/0078586 | A1 | 4/2007 | Pallett et al. |
| 2007/0131183 | A1* | 6/2007 | Shei ................ F02B 73/00 123/48 R |
| 2009/0259380 | A1 | 10/2009 | Picron et al. |
| 2010/0042279 | A1 | 2/2010 | Thompson et al. |
| 2011/0115439 | A1 | 5/2011 | Kim |
| 2013/0096759 | A1* | 4/2013 | Breton ................ B60W 20/10 701/22 |
| 2013/0255639 | A1* | 10/2013 | Guillen Castillo ... B60W 10/08 123/472 |
| 2013/0276755 | A1 | 10/2013 | Springer et al. |
| 2015/0203105 | A1* | 7/2015 | Liang ..................... B60L 15/20 701/22 |
| 2015/0314773 | A1 | 11/2015 | Zhou et al. |

FOREIGN PATENT DOCUMENTS

| | | |
|---|---|---|
| JP | 08-312393 A | 11/1996 |
| JP | 2002-013423 A | 1/2002 |
| JP | 2002276416 A | 9/2002 |
| JP | 2004-052573 A | 2/2004 |
| JP | 2004108342 A | 4/2004 |
| JP | 2007-069860 A | 3/2007 |
| JP | 2007-162672 A | 6/2007 |
| JP | 2010-247830 A | 11/2010 |
| JP | 2011-051383 A | 3/2011 |
| JP | 2015-101959 A | 6/2015 |
| KR | 1997-0044043 A | 7/1997 |
| KR | 10-2006-0069095 A | 6/2006 |
| KR | 10-2011-0054135 A | 5/2011 |
| KR | 10-1091664 B1 | 12/2011 |
| KR | 10-2013-0106482 A | 9/2013 |
| KR | 10-2014-0059680 A | 5/2014 |

OTHER PUBLICATIONS

U.S. Final Office Action issued in U.S. Appl. No. 14/954,450, dated Jul. 3, 2017.
Non-Final Office Action dated Jan. 17, 2017, issued in U.S. Appl. No. 14/954,450.
Non-Final Office Action issued in related U.S. Appl. No. 15/266,680, dated Nov. 21, 2017.
Non-Final Office Action issued in U.S. Appl. No. 14/954,450, dated Jan. 11, 2018.
Non-Final Office Action issued in U.S. Appl. No. 15/264,998, dated Mar. 21, 2018.
Non-Final Office Action issued in U.S. Appl. No. 15/264,812, dated Apr. 2, 2018.
Notice of Allowance issued in U.S. Appl. No. 15/266,680, dated Apr. 4, 2018.

\* cited by examiner

USER INTERFACE APPARATUS OF NON-UNIFORM DISPLACEMENT ENGINE CONTROL SYSTEM AND CONTROL METHOD OF THE USER INTERFACE APPARATUS OF NON-UNIFORM DISPLACEMENT ENGINE CONTROL SYSTEM

CROSS-REFERENCE TO RELATED APPLICATION

This application claims under 35 U.S.C. § 119(a) the benefit of priority to Korean Patent Application Nos. 10-2015-0131356 and 10-2016-0054153 filed on Sep. 17, 2015 and May 2, 2016 with the Korean Intellectual Property Office, respectively, the entire contents of which are incorporated herein by reference.

TECHNICAL FIELD

The present disclosure relates to a user interface apparatus of a non-uniform displacement engine control system and a control method of the same. More particularly, the present disclosure relates to a user interface apparatus in a vehicle having an engine including cylinders having different, or variable, displacements and a motor for supplementing driving force of the engine and a control method of the same.

BACKGROUND

A conventional internal combustion engine is generally configured such that cylinders have uniform displacements in order to satisfy the distribution characteristics of intake and exhaust systems. The uniform displacement engine has an advantage in that it is possible to easily control the air-to-fuel ratio and exhaust gas. However, the uniform displacement engine has a disadvantage in that the margin for operation point control is insufficient due to the fixed displacement thereof. As a result, it is difficult to satisfy both operational efficiency and fuel efficiency within a specific operation zone, and therefore problems must be addressed by compromising both operational efficiency and fuel efficiency.

In addition, in the engine having fixed displacement cylinders, excessive mechanical energy is consumed in order to secure stable idling, which is inefficient. In particular, operation point control is frequently inefficient due to limitations caused by vibration and noise.

Such problems, which frequently occur over the entire operation zone of the conventional internal combustion engine, are solved by striking a tradeoff between operational efficiency, fuel efficiency, and exhaust properties.

Meanwhile, Japanese Patent Laid-Open Publication No. 2007-162672 discloses a cylinder arrangement structure of a multi-stage type displacement adjustable engine in which cylinders having different displacements are arranged such that the displacement of the engine is adjusted in multiple stages based on operational combinations of the cylinders.

The cylinder arrangement structure of the multi-stage type displacement adjustable engine disclosed in Japanese Patent Laid-Open Publication No. 2007-162672 has effects in that the displacement of the engine is adjusted in multiple stages, and therefore it is possible to control the operation of the engine in respective operation zones, thereby simultaneously improving operational efficiency and fuel efficiency. However, problems may arise in that vibration and noise are generated due to imbalance in displacement among the cylinders, making it difficult to apply the cylinder arrangement structure of the multi-stage type displacement adjustable engine to vehicles that are actually mass-produced.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a non-uniform displacement engine control system and method that are capable of reducing vibration and noise generated by a non-uniform displacement engine including cylinders having different displacements and of securing various levels of power performance based on driving conditions through the cooperation of the engine and a motor, and a control method of the same. It is another object of the present disclosure to provide a user interface apparatus of the non-uniform displacement engine control system.

In one aspect, the present disclosure provides a user interface apparatus for controlling a vehicle including a non-uniform displacement engine comprising at least two kinds of cylinders having different displacements, a motor connected to a driving shaft of the engine, and a motor control unit for controlling the motor, the user interface apparatus including an input for selecting a control mode of the non-uniform displacement engine and the motor, an interface controller communicating with the motor controller such that the motor is controlled in the selected control mode, and a display device for displaying information about the selected control mode, wherein the user interface apparatus has a control mode for controlling the motor to compensate for a difference in torque due to different displacements of the cylinders such that the sum of engine torque and motor torque in explosion stroke of each cylinder is uniform.

In a preferred embodiment, the input may be configured to select a fixed mode function of selecting one from among predetermined control modes and a variable mode function of adjusting the control modes.

In another preferred embodiment, the interface controller may store information about a default mode and, in the case in which no control mode is selected or the selected control mode is released, transmit a command for switching to the default mode to the motor controller.

In still another preferred embodiment, the default mode may be a mode for not driving the motor or controlling the motor so as to create predetermined driving torque.

In yet another preferred embodiment, the interface controller may receive information about a state of charge (SOC) of a battery from a battery controller and, in the case in which the received information about the SOC of the battery is within a predetermined range or a command for releasing the selection of the control mode is received from the input, perform control of switching to the default mode.

In still yet another preferred embodiment, a non-uniform control option and a uniform control option may be selected in the variable mode function.

In a further preferred embodiment, the bias amount of regenerative torque or driving torque of the motor may be set in the non-uniform control option.

In another further preferred embodiment, the power level of the engine and the motor may be set in the uniform control option.

In still another further preferred embodiment, the display device may be configured to display at least one selected from the group consisting of selected control modes, the SOC of the battery, the power level, the driving torque and regenerative torque of the motor, and information about uniform control or non-uniform control.

In yet another further preferred embodiment, the control mode may include a first mode for controlling the motor such that energy regeneration is achieved in explosion strokes of high displacement cylinders and controlling the motor such that power assistance is achieved by motor torque in explosion strokes of low displacement cylinders, a second mode for controlling the motor such that the motor is not driven in the explosion strokes of the high displacement cylinders and controlling the motor such that power assistance is achieved by motor torque in the explosion strokes of the low displacement cylinders, and a third mode for controlling the motor such that energy regeneration is achieved in the explosion strokes of the high displacement cylinders and controlling the motor such that the motor is not driven in the explosion strokes of the low displacement cylinders.

In another aspect, the present disclosure provides a control method of a user interface apparatus for controlling a vehicle including a non-uniform displacement engine including at least two kinds of cylinders having different displacements, a motor connected to a driving shaft of the engine, and a motor controller for controlling the motor, the control method including (a) selecting a control mode of the non-uniform displacement engine and the motor through an input, (b) enabling an interface controller to communicate with the motor controller such that the motor is controlled in the selected control mode, and (c) controlling the motor in the selected control mode through the motor controller, wherein the control mode includes a control mode for controlling the motor to compensate for a difference in torque due to different displacements of the cylinders such that a sum of engine torque and motor torque in explosion stroke of each cylinder is uniform.

In a preferred embodiment, the control method may further include selecting a fixed mode function of selecting one from among predetermined control modes and a variable mode function of adjusting the control modes before step (a).

In another preferred embodiment, the interface controller may store information about a default mode and, in the case in which no control mode is selected or the selected control mode is released, transmit a command for switching to the default mode to the motor controller.

In still another preferred embodiment, the default mode may be a mode for not driving the motor or controlling the motor so as to create predetermined driving torque.

In yet another preferred embodiment, the interface controller may receive information about an SOC of a battery from a battery controller and, in the case in which the received information about the SOC of the battery is within a predetermined range or a command for releasing the selection of the control mode is received from the input, perform control of switching to the default mode.

In still yet another preferred embodiment, a non-uniform control option and a uniform control option may be selected in the variable mode function.

In a further preferred embodiment, the bias amount of regenerative torque or driving torque of the motor may be set in the non-uniform control option. In another further preferred embodiment, the power level of the engine and the motor may be set in the uniform control option.

In still another further preferred embodiment, the method may further include displaying selectable control modes through a display device before step (a) and displaying at least one selected from the group consisting of selected control modes, the SOC of the battery, the power level, the driving torque and regenerative torque of the motor, and information about uniform control or non-uniform control through the display device after step (a).

In yet another further preferred embodiment, the control mode may include a first mode for controlling the motor such that energy regeneration is achieved in explosion strokes of high displacement cylinders and controlling the motor such that power assistance is achieved by motor torque in explosion strokes of low displacement cylinders, a second mode for controlling the motor such that the motor is not driven in the explosion strokes of the high displacement cylinders and controlling the motor such that power assistance is achieved by motor torque in the explosion strokes of the low displacement cylinders, and a third mode for controlling the motor such that energy regeneration is achieved in the explosion strokes of the high displacement cylinders and controlling the motor such that the motor is not driven in the explosion strokes of the low displacement cylinders.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure proposes a new-concept non-uniform displacement engine control system that performs control using a motor in a system including a non-uniform displacement engine including cylinders having different displacements, thereby achieving different displacements based on driving conditions, and a method for the same. In particular, the present disclosure has another characteristic in that a system depending upon the conventional inefficient use of mechanical energy is configured to utilize electrical energy, which is more efficient, thereby improving overall system efficiency.

In addition, the present disclosure has another characteristic in that a charge intention mode or a discharge intention mode is selectively used based on a state of charge (SOC) of a battery, whereby it is possible to maintain the state of charge of the battery to be uniform by variably controlling the charge amount or the discharge amount based on the current state of the battery.

The present disclosure is configured such that high displacement cylinders and low displacement cylinders are arranged to execute a high displacement mode and a low displacement mode based on driving conditions, thereby improving fuel efficiency and power performance using the increase in potential energy and kinetic energy of displacement. In addition, the proportion of a vibration/noise generation area that can be controlled by the motor is increased, thereby improving the use of a more advantageous driving point.

In an embodiment of the present disclosure, the non-uniform displacement engine has a four cylinder structure including two cylinders of one kind, or size, having the same displacement as each other and two cylinders of another kind, or size, having the same displacement as each other. However, the present disclosure is not limited thereto, and it should be noted that extension and modification are possible so long as the technical concepts of the present disclosure are not changed.

Hereinafter, a motor-assisted non-uniform displacement engine control system according to an embodiment of the present disclosure and a method for the same will be described in detail with reference to the accompanying drawings.

Figure 1:
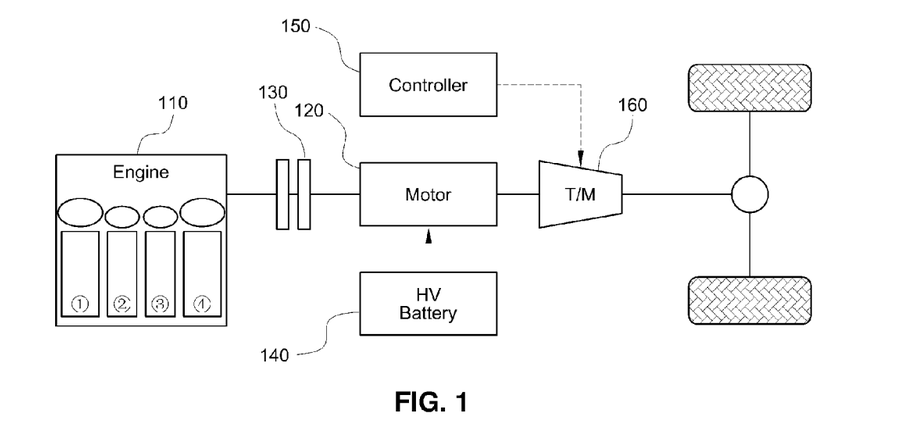
FIG. 1 is a view schematically showing the construction of a non-uniform displacement engine control system according to an embodiment of the present disclosure.

FIG. 1 is a view schematically showing the construction of a motor-assisted non-uniform displacement engine control system according to embodiments of the present disclosure.

As shown in FIG. 1, the system may include an engine and a motor as driving sources that provide driving torque necessary to propel a vehicle.

Driving shafts of the engine and the motor are connected to each other via a power switching device, such as a clutch. However, the present disclosure is not limited thereto. The driving shafts of the engine and the motor may be directly connected to each other. In addition, the system may include a battery for supplying electrical energy to the motor and a motor controller for controlling the operation of the motor.

In the present disclosure, the battery may be used as an electrical energy supply means. However, the present disclosure is not limited thereto as long as the electrical energy supply means can supply the electrical energy necessary to drive the motor while storing the electrical energy.

In addition, although not shown, the system may include an engine controller for controlling the engine. The engine controller and the motor controller may be controlled by a higher-level controller. In addition, the engine controller and the motor controller may be integrated into a single controller.

In addition, driving torque from the engine and the motor may be transmitted to driving wheels via a transmission.

Meanwhile, as shown in FIG. 1, the control system of the present disclosure may include a non-uniform displacement engine including a plurality of at least two kinds, or sizes, of cylinders having different displacements.

The non-uniform displacement engine is characterized by different displacements for respective cylinders, and selects the merits and demerits of high displacement and low displacement based on a controllable strategy, or algorithm, in order to improve fuel efficiency and power performance. In addition, according to the present disclosure, which may be configured as a system assisted by the motor, it is possible to compensate for the characteristics of each cylinder utilizing the motor. Moreover, it is possible to improve driving efficiency and to optimize energy efficiency through energy recovery. In particular, unlike the related art in which excessive mechanical energy is used in order to ensure stable idling, it is possible to ensure stable idling utilizing the electrical energy of the motor. In addition, it is possible to mitigate vibration and noise utilizing the motor.

For example, as shown in FIG. 1, the non-uniform displacement engine may be configured to have a four cylinder structure including two cylinders of one kind having the same displacement and two cylinders of another kind having the same displacement.

Non-uniform displacement may be set based on the characteristics of the system. The cylinders are symmetrically arranged in ignition (explosion) order such that a vibration component caused by the difference in displacement can be offset.

That is, in explosion order 1-3-4-2 or 1-2-4-3, cylinders located at corresponding positions, i.e. the first and fourth cylinders and the second and third cylinders may have the same displacement, and other cylinder groups may have different displacements.

For example, the first and fourth cylinders may have high displacement, and the second and third cylinders may have lower displacement that the first and fourth cylinders. This case is shown in FIG. 1.

According to this cylinder arrangement, it is possible to offset a vibration component based on the arrangement of the cylinders at corresponding positions, thereby improving vibration and noise characteristics.

In the case in which the engine is configured as a four-cylinder engine having a total displacement of 1.5 L according to a first embodiment, as an example of the present disclosure, the first and fourth cylinders may have a displacement of 0.4 L for each of the two cylinders, which is a relative high displacement, and the second and third cylinders may have a low displacement of 0.35 L for each of the two cylinders, which is a relatively low displacement.

According to the first embodiment, the four-cylinder engine may be ignited in order 1-3-4-2, and cylinders having different displacements may be arranged so as to correspond to the opposite cylinders in the ignition order, in order to offset a vibration component which may be caused due to non-uniform displacement.

Figure 2:
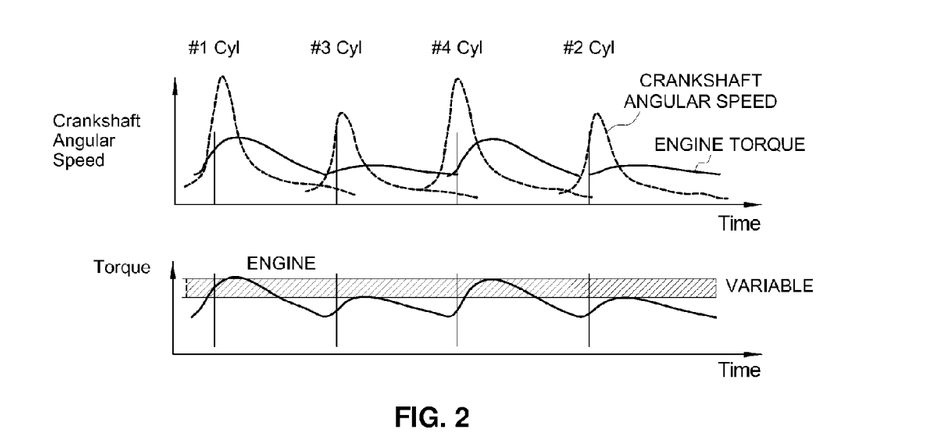
FIG. 2 is a graph showing the dynamic characteristics of a non-uniform displacement engine according to an embodiment of the present disclosure.

Meanwhile, FIG. 2 is a graph showing the dynamic characteristics of a non-uniform displacement engine according to the first embodiment.

As shown in FIG. 2, the first and fourth cylinders, which are high displacement cylinders, have higher torque and crankshaft angular speed, which are generated as a result of explosions, than the second and third cylinders. That is, referring to the crankshaft angular speed and the engine torque in the explosion stroke of each cylinder, the high displacement cylinders have higher crankshaft angular speeds and engine torques than the lower displacement cylinders.

The explosion stroke of each cylinder means a period set based on the same criterion, such as crank angles before and after the explosion of each cylinder or the distance from a top dead center (TDC) to the upper end of a piston that is set.

The difference in displacement among the cylinders causes non-uniform driving of the engine, resulting in vibration and noise.

Meanwhile, an embodiment of the present disclosure includes motor control for compensating for non-uniform engine driving characteristics.

Figure 3:
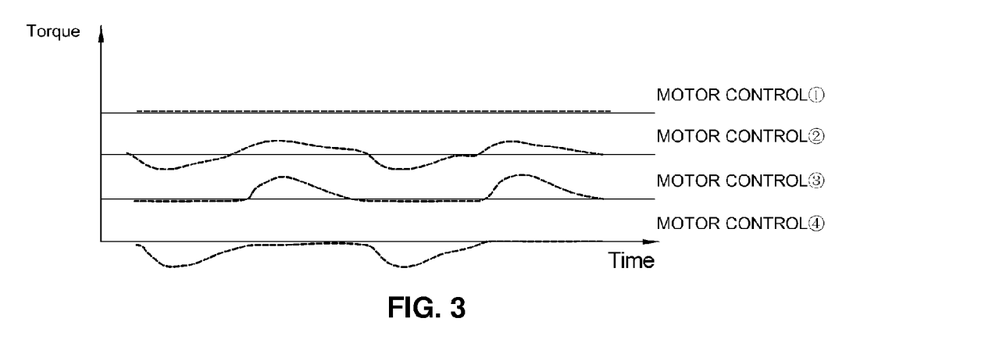
FIG. 3 is a view showing motor torque control that assists torque output from a non-uniform displacement engine according to an embodiment of the present disclosure.

FIG. 3 shows examples of such motor control. Specifically, FIG. 3 shows examples of motor torque control assisting torque output from a non-uniform displacement engine. In addition, FIGS. 4A to 4D respectively show motor control methods according to motor control modes ① to ④ shown in FIG. 3.

FIG. 3 shows motor control modes ① to ④. In motor control mode ①, the motor is not driven, or the motor is controlled to generate uniform driving torque. In motor control modes ② to ④, the motor is controlled differently in respective explosion strokes of the non-uniform displacement engine.

Figure 4A:
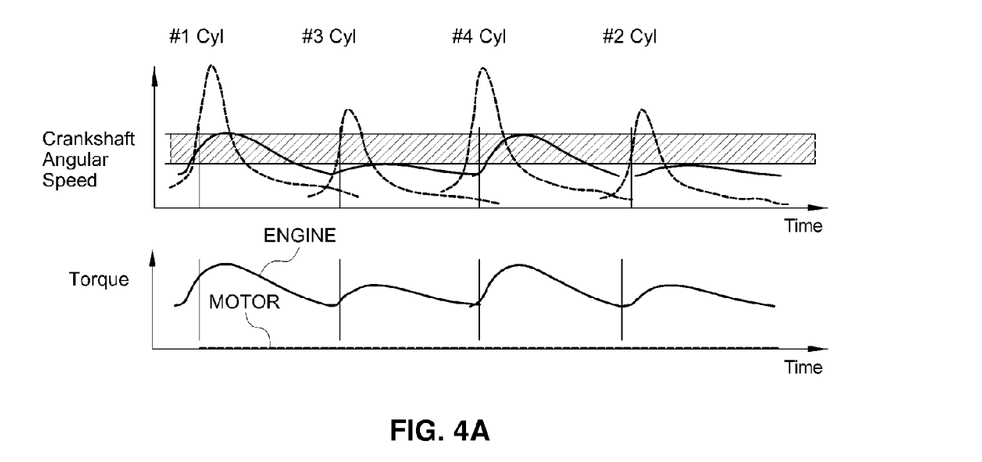
FIGS. 4A to 4D are views showing a control method of a motor-assisted non-uniform displacement engine control system according to embodiments of the present disclosure.

Particularly, in motor control mode ①, as shown in FIG. 4A, the motor is not driven, or the motor is controlled to generate uniform driving torque. Since pulsation components of the high displacement cylinders and the lower displacement cylinders are utilized, unique driving characteristics of the non-uniform displacement engine remain unchanged (the crankshaft angular speed is not changed).

Consequently, it is possible to improve driving efficiency and fuel efficiency at a high efficiency point utilizing increments in kinetic energy of the high displacement cylinders and to improve responsiveness in a transition state and power performance utilizing the increase in potential energy.

Meanwhile, in motor control modes ② to ④, the motor is controlled differently in respective explosion strokes of the non-uniform displacement engine. In motor control mode ②, power assistance and energy regeneration are proportionally controlled in order to minimize a vibration component. Motor control mode ③ is used for traveling at the maximum power, and motor control mode ④ is used for traveling at the minimum power.

That is, in motor control modes ② to ④, the motor is selectively controlled by the motor controller. The motor control may be performed in order to compensate for the difference in torque due to the different displacements of the cylinders. In the explosion stroke of each cylinder, therefore, the motor may be controlled such that the sum of the engine torque and the motor torque is uniform using driving or energy regeneration of the motor. Motor control modes ② to ④ are respectively shown in FIGS. 4B to 4D. In each torque graph, the solid line indicates engine torque, and the dotted line indicates motor torque. In addition, it can be seen from a comparison with FIG. 4A that it is possible to obtain uniform crankshaft angular speed through power assistance or energy regeneration by the motor.

Figure 4B:
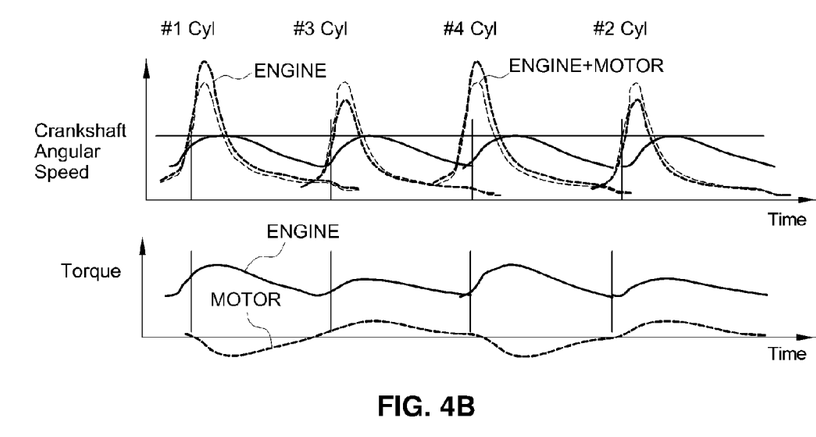

Specifically, in motor control mode ②, a target displacement is set, and a driving torque of the engine and the motor is set based on the target displacement, such that the motor has uniform output characteristics in all explosion strokes. As shown in FIG. 4B, the motor is controlled such that negative torque is generated through energy regeneration of the motor in the explosion strokes of the high displacement cylinders, and the motor is controlled such that positive torque is generated by the motor to achieve power assistance in the explosion strokes of the low displacement cylinders. The motor is controlled to have uniform output characteristics in the respective explosion strokes, whereby it is possible to minimize a vibration component of the non-uniform displacement engine.

Figure 4C:
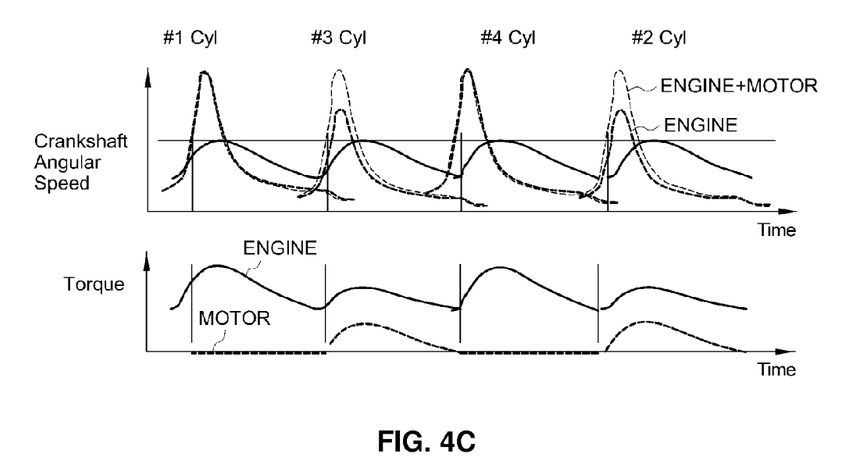

Motor control mode ③ is used for traveling at the maximum power of the non-uniform displacement engine. The motor is controlled such that the low displacement cylinders are assisted by the motor to achieve the maximum power of the given non-uniform displacement. In motor control mode ③, the motor may be controlled such that the same power performance from the explosion strokes of the high displacement cylinders is achieved in the explosion strokes of the low displacement cylinders through power assistance by the motor. As shown in FIG. 4C, therefore, the motor is controlled such that power assistance by the motor is not achieved in the explosion strokes of the high displacement cylinders and such that traveling is performed at the maximum power from the explosion strokes of the high displacement cylinders through power assistance by the motor only in the explosion strokes of the low displacement cylinders.

Figure 4D:
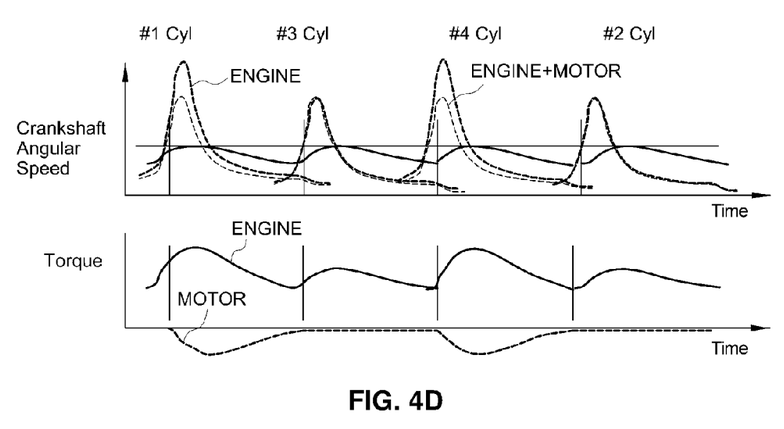

Meanwhile, motor control mode ④ is used for traveling at the minimum power of the non-uniform displacement engine. The motor is controlled such that the excessive energy from the high displacement cylinders is recovered by the motor to achieve the minimum power of the given non-uniform displacement. In motor control mode ④, as shown in FIG. 4D, the motor is controlled such that power assistance by the motor is not achieved in the explosion strokes of the low displacement cylinders and such that negative torque is generated by energy regeneration in the explosion strokes of the high displacement cylinders, reversely to motor control mode ③. Particularly, in motor control mode ④, the motor is controlled based on the minimum power of the low displacement cylinders. Consequently, the motor is operated at uniform minimum power based on the low displacement cylinders.

Motor control modes ① to ④ may be selectively used by the motor controller. For example, the motor controller may store motor control modes ② to ④, which are different from one another, and may select any one thereamong to control the motor.

In an embodiment of the present disclosure, it is possible to variably configure the substantial driving characteristics of the vehicle according to the utilization of the motor based on the high displacement and the low displacement of the non-uniform displacement engine. In particular, it is possible to elaborately perform variable displacement control within a set range of displacement through the use of the motor control modes.

Figure 5A:
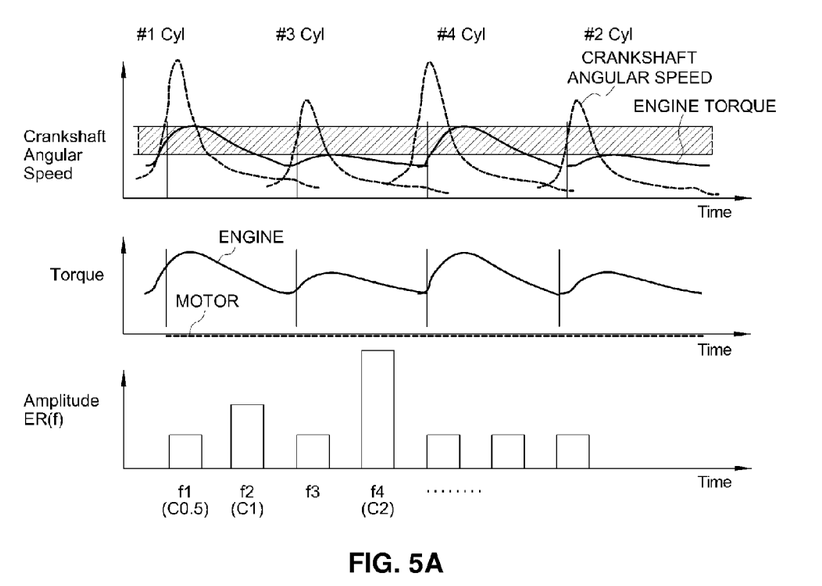
FIGS. 5A and 5B are graphs respectively showing normal control and compensation control modes of the non-uniform displacement engine control system in a frequency domain according to an embodiment of the present disclosure.
Figure 5B:
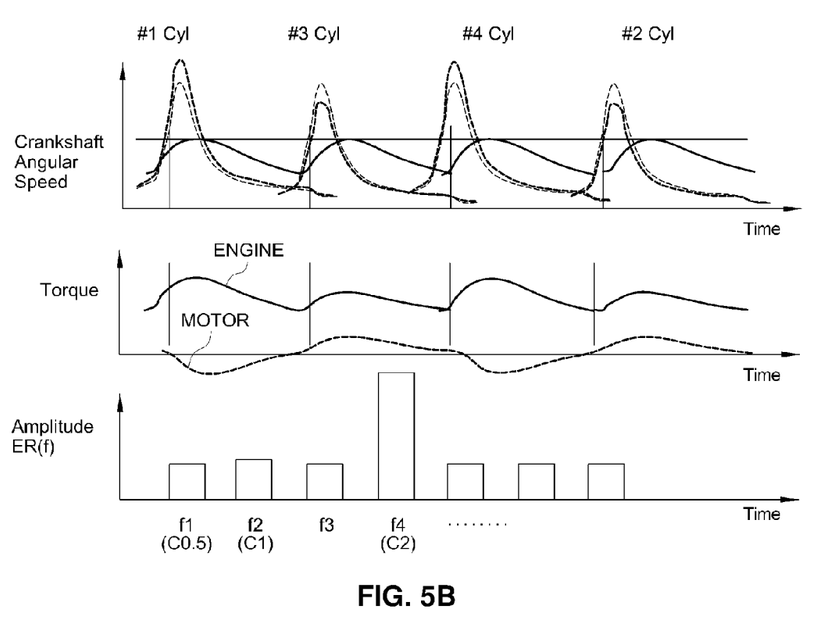

FIGS. 5A and 5B are graphs respectively showing normal control and compensation control modes of a non-uniform displacement engine control system in a frequency domain, particularly showing improvement in the vibration characteristics. That is, in an example of FIG. 5A, a C1 component of the frequency domain is large, and, in an example of FIG. 5B, the C1 component of the frequency domain is greatly reduced through the use of control modes ② to ④, thereby greatly reducing vibration and noise.

Meanwhile, the present disclosure provides a user interface apparatus 200 of the non-uniform displacement engine control system. The user interface apparatus 200 may wake up when the vehicle is started. The user interface apparatus 200 receives necessary driving power from a low-voltage battery for driving electronic devices in the vehicle. The user interface apparatus 200 may include an input 221 for user input, a display device 222 for displaying information about driving states and the like, and an interface controller 210 for controlling the input 221 and the display device 222.

Figure 6:
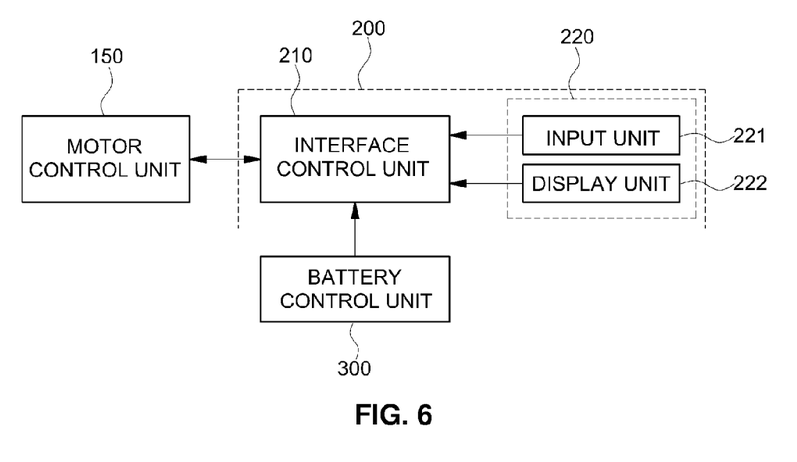
FIG. 6 is a view showing the control flow of a user interface apparatus according to an embodiment of the present disclosure.

The basic control flow of the user interface apparatus 200 is shown in FIG. 6. As shown in FIG. 6, the user interface apparatus 200 receives information about selection of a specific control mode through the input 221, and displays the selected information through the display device 222. In addition, the interface controller 210 may communicate with the motor controller. In a communication environment, the selected information may be transmitted to the motor controller, and the motor controller may control the motor based on the received information. The input 221 and the display device 222 may be integrated into an input and output 220, which is a display device including a touch panel. Consequently, selectable information may be displayed through the display device 222, and then selection of information may be performed by an input through the touch panel. The input and output 220 may be a display device, including a touch panel and a display panel, which are provided in the center fascia of the vehicle.

Meanwhile, in an embodiment of the present disclosure, the interface controller 210 may communicate with a battery controller 300, which manages the battery for driving the motor. The battery controller 300 transmits information about a state of charge (SOC) of the battery to the interface controller 210. The SOC of the battery may be used as information to determine a control mode. That is, charge and discharge tendencies may be different in the control modes ① to ④, and thus the SOC of the battery may be managed using such tendencies.

For example, when the SOC of the battery is too low in a discharge intention control mode (for example, control mode ③ for providing the maximum output), in which power of the battery is consumed, the control mode may be stopped and switched to a charge intention control mode (for example, control mode ④ for providing the minimum output). However, the present disclosure is not limited thereto. For example, when control mode ① is set as a default mode and is not selected or a mode release condition (including release of user's selection) occurs, switching to the default mode may be performed.

The interface controller 210 stores information about the default mode.

In the case in which the control mode is not selected, therefore, the interface controller 210 communicates with the motor controller such that the motor is controlled in the default mode. In addition, in the case in which the selected control mode is released, the interface controller 210 transmits a command for switching to the default mode to the motor controller.

As previously described, the default mode may be control mode ①, in which the motor is not driven, or a mode for controlling the motor so as to create predetermined driving torque.

Meanwhile, the input 221 may be provided to select one of a fixed mode function and a variable mode function.

The fixed mode function is a function of selecting one of the predetermined control modes. The variable mode function is a function of adjusting a control mode according to a setting desired by a user in addition to the predetermined control modes. In the fixed mode function, therefore, only one of the predetermined control modes may be selected.

In the variable mode function, on the other hand, the user may arbitrarily adjust the predetermined control modes. Consequently, the user may adjust the bias amount of regenerative torque or driving torque of the motor.

The adjustment of the bias amount may be performed by the user through the input 221. The bias amount may be adjusted using a touch panel or a jog dial.

In the variable mode function, a non-uniform control option and a uniform control option may be selected. Uniform control means outputting uniform torque (engine+motor) by adjusting the assistance amount of the motor in spite of output from the non-uniform displacement engine, as in control modes ② to ④. On the other hand, non-uniform control means outputting non-uniform torque (engine+motor), as in control mode ①.

In the non-uniform control option, therefore, the bias amount of regenerative torque or driving torque of the motor is set. That is, the user may adjust the bias amount in control modes ② to ④ to set a non-uniform control state.

In the uniform control option, on the other hand, the user sets a power level based on the engine and the motor. That is, the user may set a desired power level between control mode ③ for providing the maximum power and control mode ④ for providing the minimum power. In this case, the interface controller 210 communicates with the motor controller such that the motor is controlled according to the power level desired by the user. A motor control algorithm based on the required power level may be stored in the interface controller 210 or in the motor controller.

Figure 7A:
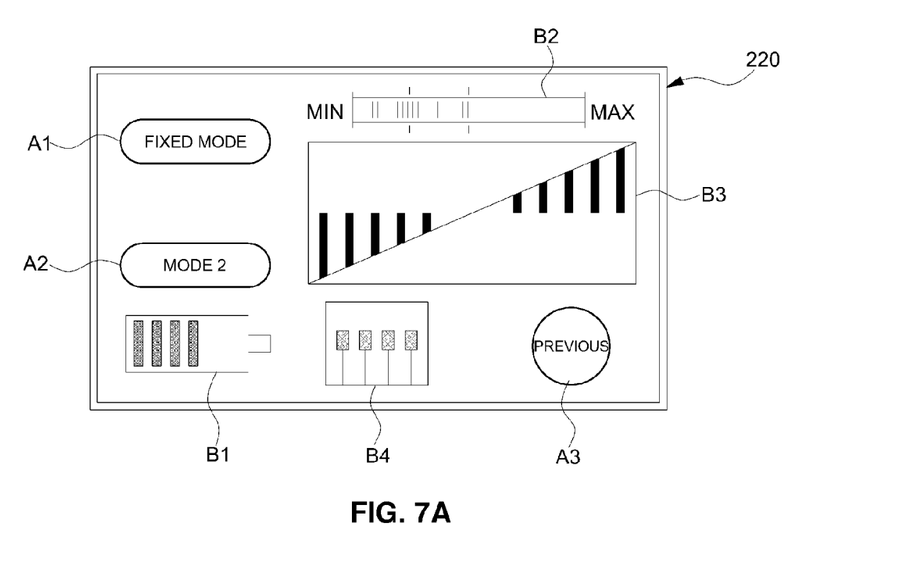
FIGS. 7A and 7B are views showing a user interface apparatus according to embodiments of the present disclosure.
Figure 7B:
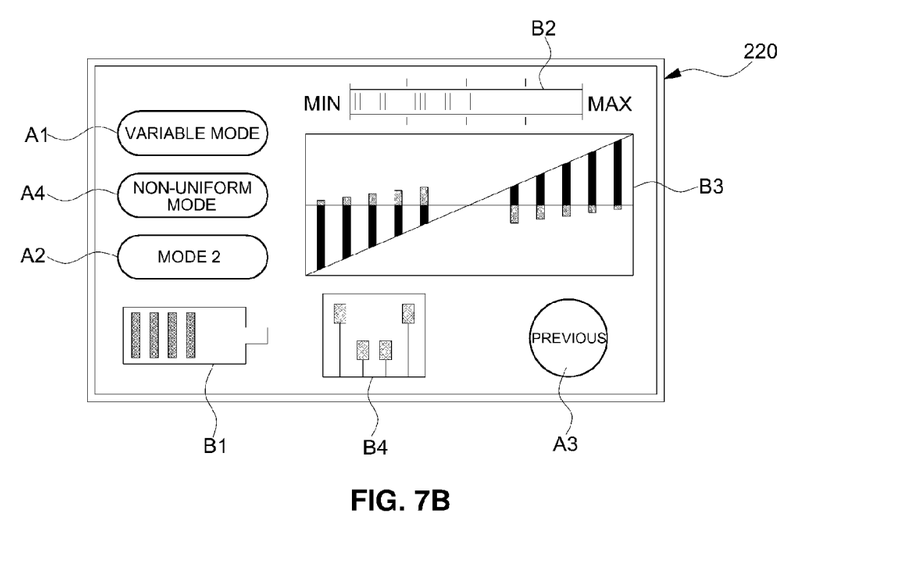

FIGS. 7A and 7B are views showing the user interface apparatus 200 according to embodiments of the present disclosure. In FIGS. 7A and 7B, examples in which input and output are performed through the input and output 220, which is the display device of the vehicle, are shown.

As shown in FIG. 7A, the display device functions as the display device 222, and displays at least one selected from the group consisting of selected control modes A1 and A2, the SOC of the battery B1, the power level B2, the driving torque and regenerative torque of the motor B3, and information B4 about uniform control or non-uniform control. For reference, reference symbol A3 indicates a "previous" menu for return. The selected control modes A1 and A2 indicate information about the current control modes. The SOC of the battery B1 indicates the remaining SOC of the battery. The power level B2 indicates the power level of the vehicle output by the engine and the motor. The driving torque and regenerative torque of the motor B3 indicate information about motor torque. Based on the horizontal center line, the right part indicates positive torque (torque assistance amount), and the left part indicates negative torque (energy regeneration amount). The information B4 indicates uniform control or non-uniform control. In the case in which piston heads have the same height, as shown in FIG. 7A, it indicates uniform control. In the case in which the piston heads have different heights, as shown in FIG. 7B, it indicates non-uniform control.

The input and output 220 may also function as the input 221. In this example, the user may click or drag information displayed on the display device to select a control mode and to adjust a required power level and bias amount.

FIG. 7A shows the state in which the fixed mode function is enabled, whereas FIG. 7B shows the state in which the variable mode function is enabled. Consequently, the example of FIG. 7B is different from the example of FIG. 7A in that information A4 about uniform control or non-uniform control is displayed. In addition, the example of FIG. 7B, displaying that non-uniform control is performed due to the bias amount (B4), is different from the example of FIG. 7A, displaying the fixed mode of uniform control, i.e. control mode ②.

According to the present disclosure, a control method of the user interface apparatus may include (a) selecting one of the control modes of the non-uniform displacement engine and the motor through the input, (b) enabling the interface controller to communicate with the motor controller such that the motor is controlled based on the selected control mode and (c) controlling the motor based on the selected control mode through the motor controller.

Before step (a), a fixed mode function of selecting one of the predetermined control modes and a variable module function of adjusting the control mode may be selected. In addition, before step (a), a step of displaying selectable control modes through the display device may be further included.

In addition, after step (a), a step of displaying at least one selected from the group consisting of the selected control modes, the SOC of the battery, the power level, the driving torque and regenerative torque of the motor and information about uniform control or non-uniform control may be further included.

Figure 8A:
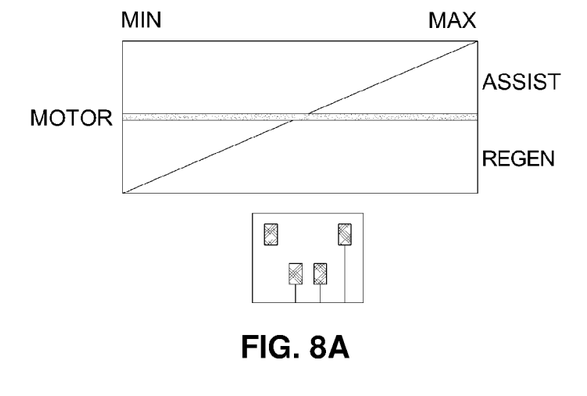
FIGS. 8A to 8G are views showing display information for respective states in a user interface apparatus according to embodiments of the present disclosure.
Figure 8B:
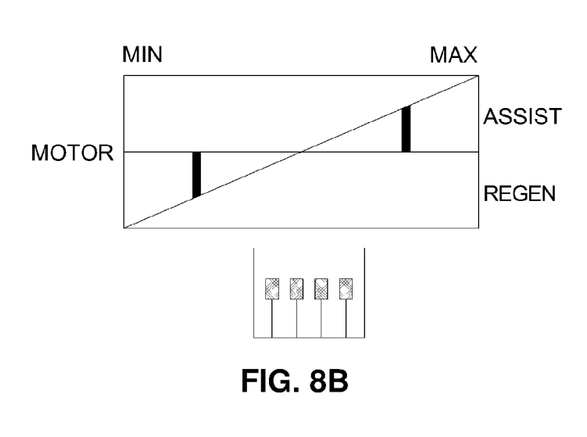
Figure 8C:
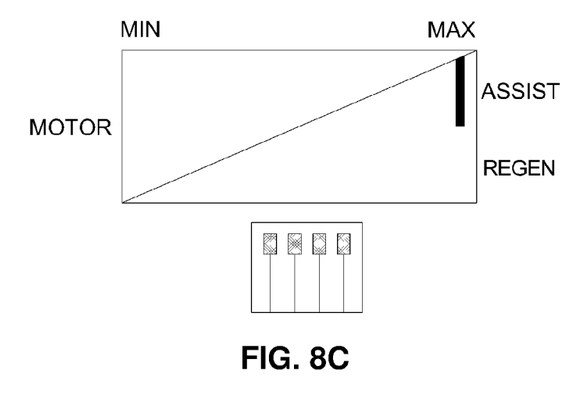
Figure 8D:
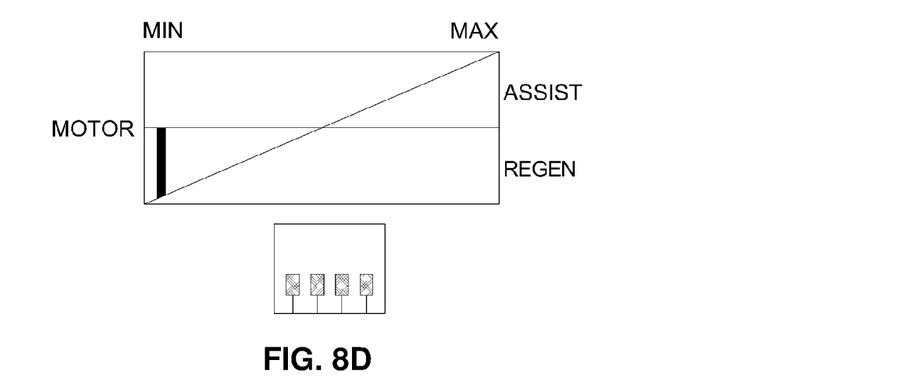
Figure 8E:
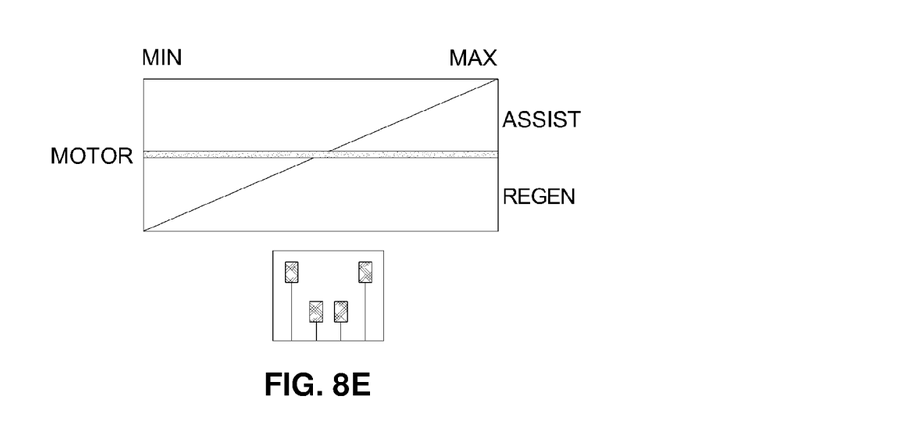

FIG. 8 is a view showing examples of information B3 about the driving torque and regenerative torque of the motor and information B4 about uniform control or non-uniform control. FIGS. 9A and 9B are control flowcharts of a user interface apparatus according to embodiments of the present disclosure. Particularly, FIG. 9A shows the case in which the fixed mode function has been selected, whereas FIG. 9B shows the case in which the variable mode function has been selected.

In the fixed mode function, as shown in FIG. 9A, the user determines whether a user's selection switch is ON (S410). The user's selection switch means a switch input that is capable of determining whether a user selects a control mode through the input and output 220, such as the display device.

In the case in which the user's selection switch is OFF, i.e. the user has not selected any control mode, control is performed in a predetermined default mode (S420). In the case in which the user's selection switch is ON, selectable modes are displayed (S430), and a step (S440) of the user selecting a specific one of the displayed modes is performed. In the case in which the mode selection has not been input for a predetermined time in the control mode selection procedure, control may be initialized, and then the procedure may enter the default mode.

In the case in which the default mode has been entered in the state in which the fixed mode has been selected through the above procedure (S420), control is performed in control mode D. In this case, motor torque is not output, and the user interface apparatus is displayed, as shown in FIG. 8(a).

In the case in which the control mode has been selected, the vehicle is driven in the selected control mode (S450). Although not shown, this step (S450) includes allowing the interface controller to transmit information about the selected control mode to the motor controller and allowing the motor controller to control the motor based on the received information.

In this case, the selected control mode is output to the user interface apparatus. FIG. 8(b) shows control mode ②. Uniform control in which the piston heads have uniform middle height is displayed such that the control model shown in FIG. 4B is displayed, and the torque assistance amount and energy regeneration amount of the motor are displayed. In the case in which control mode ③ and control mode ④ have been selected, respectively, information corresponding to FIGS. 4C and 4D is displayed, as shown in FIGS. 8(c) and 8(d).

While the vehicle is being driven in the selected control mode, the interface controller determines whether a predetermined release condition is satisfied (S460). Upon determining that the predetermined release condition is satisfied, the selected control mode is terminated, and the mode returns to the default mode.

FIG. 9B shows the case in which the variable mode function has been selected. The case of FIG. 9B is similar in basic procedure to the case of FIG. 9A. In the variable mode function, however, a step of selecting uniform control or non-uniform control may be further included. In addition, a step of adjusting the predetermined mode may be further included.

Specifically, as shown in FIG. 9B, the user determines whether a user's selection switch is ON (S510).

In the case in which the user's selection switch is OFF, i.e. the user has not selected any control mode, control is performed in the predetermined default mode (S520). In this case, the user interface apparatus is displayed as shown in FIG. 8(e).

In the case in which the user's selection switch is ON, it is determined whether non-uniform control or uniform control is performed (S530). As the result of the determination, a non-uniform control procedure (S540) or a uniform control procedure (S550) is performed.

In the non-uniform control procedure (S540), selectable modes are displayed through the display device (S541), and a step (S542) of the user selecting a specific one of the displayed modes is performed.

Subsequently, the bias amount of regenerative torque or driving torque of the motor desired by the user in the selected control mode is selected (S543). The control mode is adjusted based on the selected bias amount, and the vehicle is driven in the adjusted control mode (S544).

In the uniform control procedure (S550), selectable modes are displayed (S551), and a step (S552) of the user selecting a specific one from the displayed modes is performed. In the uniform control procedure, however, the power level of the engine and the motor desired by the user is set (S553). In addition, the control mode is adjusted based on the selected power level, and the vehicle is driven in the adjusted control mode (S554).

Step S544 or step S554 includes a step of the interface controller adjusting the control mode based on the selected bias amount or the selected power level. In addition, step S544 or step S554 further includes a step of controlling the motor through communication with the motor controller using information about the adjusted control mode.

Figure 8F:
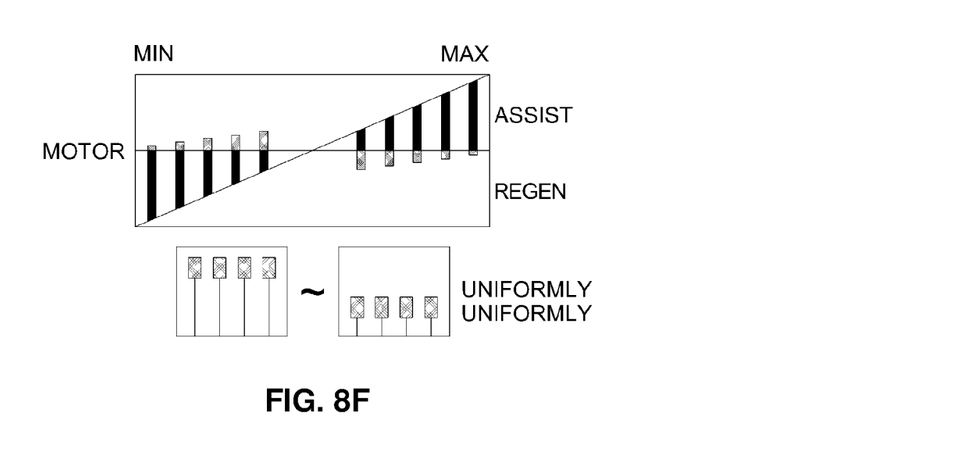
Figure 8G:
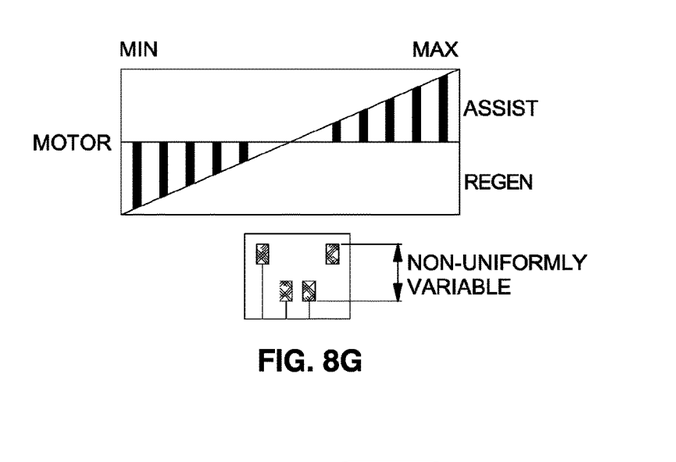
Figure 9A:
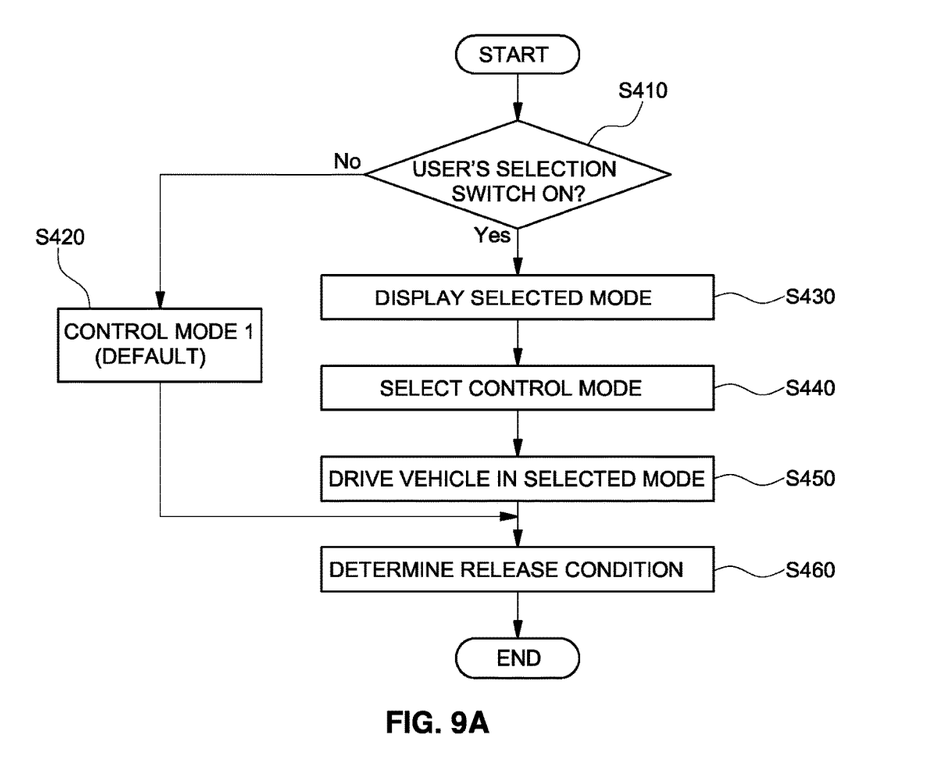
FIGS. 9A and 9B are control flowcharts of a user interface apparatus according to embodiments of the present disclosure.
Figure 9B:
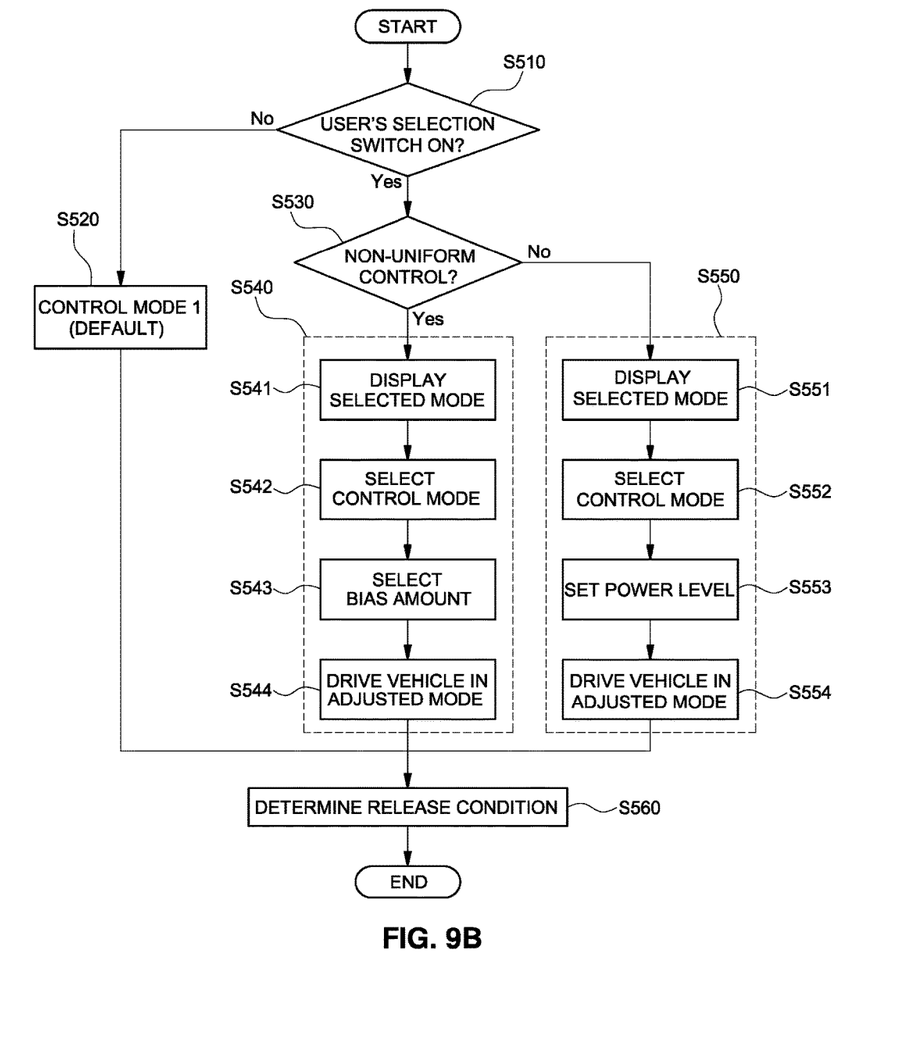

During uniform control, the user interface apparatus is displayed as shown in FIG. 8(f). During non-uniform control, the user interface apparatus is displayed as shown in FIG. 8(g). Since the output level is adjusted based on the bias amount, the display is changed based on the selected bias amount. The bias amount is displayed in B3, and information about uniform control or non-uniform control and the adjusted output level are displayed in B4.

In the same manner as in the above case, while the vehicle is being driven in the adjusted control mode, the interface controller determines whether a predetermined release condition is satisfied (S560). Upon determining that the predetermined release condition is satisfied, the control mode is terminated, and the mode returns to the default mode.

As is apparent from the above description, an embodiment of the present disclosure may be used as a variable displacement engine and a control system in a vehicle using an engine and a motor as a power source, as in a hybrid vehicle.

In addition, in an embodiment of the present disclosure, modes based on traveling conditions may be selectively embodied. Consequently, it is possible to variously perform control in operation zones, such as the exhibition of power performance or the optimization of fuel efficiency.

In addition, in an embodiment of the present disclosure, it is possible to increase freedom in the control of the hybrid vehicle, thereby proposing a new paradigm, or method, for control of the operation of the hybrid vehicle.

In particular, according to the present disclosure, it is possible to configure a driving system such that variable displacement control is elaborately performed through the use of the motor within a set variable range.

In addition, it is possible to solve vibration and noise problems caused by the non-uniform displacement engine, thereby improving driving performance.

In addition, according to the present disclosure, it is possible to enable a user to select a detailed control mode of the non-uniform displacement engine and to effectively recognize the travel state of the vehicle in the selected mode, thereby enhancing the satisfaction of vehicle travel.

In addition, it is possible to effectively display information about the detailed control mode, thereby leading to more efficient vehicle travel based on the displayed information.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A user interface apparatus for controlling a vehicle comprising a non-uniform displacement engine, which includes at least two sizes of cylinders having different displacements, a motor connected to a driving shaft of the engine, and a motor controller for controlling the motor, the user interface apparatus comprising:
   an input for selecting one control mode among a plurality of control modes of the non-uniform displacement engine and the motor;
   an interface controller communicating with the motor controller such that the motor is controlled in the selected control mode;
   a display device for displaying information about the selected control mode,
   wherein the plurality of the control modes include at least two control modes for controlling the motor to compensate for a difference in torque due to different displacements of the cylinders such that a sum of engine torque and motor torque in explosion stroke of each cylinder is uniform,
   wherein the plurality of control modes have different total driving torques by adjusting a motor assist torque and a motor regenerative torque in accordance with the engine torque such that the total driving torques vary by changing the plurality of control modes,
   wherein the motor assist torque and the motor regenerative torque, which are stored in the motor controller, compensate for the torque difference due to the different displacements of the cylinders,
   wherein each of the plurality of control modes has a target displacement being different from each other, and the motor assist torque and the motor regenerative torque vary by changing the target displacement, and
   wherein a variable displacement control is performed by changing the plurality of control modes.

2. The user interface apparatus of claim 1, wherein the input selects a fixed mode function of selecting one from among the plurality of control modes and a variable mode function of adjusting the plurality of control modes.

3. The user interface apparatus of claim 1, wherein the interface controller stores information about a default mode, and in a case in which no control mode is selected or the selected control mode is released, transmits a command for switching to the default mode to the motor controller.

4. The user interface apparatus of claim 3, wherein the default mode is a mode for not driving the motor or controlling the motor to create a driving torque.

5. The user interface apparatus of claim 3, wherein the interface controller receives information about a state of charge (SOC) of a battery from a battery controller, and in a case in which the received information about the SOC of the battery is within a predetermined range or a command for releasing the selection of the control mode is received from the input, performs a control of switching to the default mode.

6. The user interface apparatus of claim 2, wherein a non-uniform control option and a uniform control option are selected in the variable mode function.

7. The user interface apparatus of claim 6, wherein a bias amount of the regenerative torque or driving torque of the motor is set in the non-uniform control option.

8. The user interface apparatus of claim 6, wherein a power level of the engine and the motor is set in the uniform control option.

9. The user interface apparatus of claim 1, wherein the display device displays at least one selected from the group consisting of selected control mode, a SOC of a battery, a power level, a driving torque and the regenerative torque of the motor, and information about uniform control or non-uniform control.

10. The user interface apparatus of claim 3, wherein the plurality of control modes comprise:
a first mode for controlling the motor such that energy regeneration is achieved in explosion strokes of high displacement cylinders and controlling the motor such that power assistance is achieved by motor torque in explosion strokes of low displacement cylinders;
a second mode for controlling the motor such that the motor is not driven in the explosion strokes of the high displacement cylinders and controlling the motor such that power assistance is achieved by motor torque in the explosion strokes of the low displacement cylinders; and
a third mode for controlling the motor such that energy regeneration is achieved in the explosion strokes of the high displacement cylinders and controlling the motor such that the motor is not driven in the explosion strokes of the low displacement cylinders.

11. A control method of a user interface apparatus for controlling a vehicle, which includes a non-uniform displacement engine comprising at least two kinds of cylinders having different displacements, a motor connected to a driving shaft of the engine, and a motor controller for controlling the motor, the control method comprising steps of:
(a) selecting one of a plurality of control modes of the non-uniform displacement engine and the motor by an input;
(b) enabling an interface controller to communicate with the motor controller such that the motor is controlled in the selected control mode; and
(c) controlling the motor in the selected control mode by the motor controller,
wherein the plurality of the control modes comprise at least two control modes for controlling the motor to compensate for a difference in torque due to different displacements of the cylinders such that a sum of engine torque and motor torque in explosion stroke of each cylinder is uniform,
wherein the plurality of control modes have different total driving torques by adjusting a motor assist torque and a motor regenerative torque in accordance with the engine torque such that the total driving torques vary by changing the plurality of control mode,
wherein the motor assist torque and the motor regenerative torque, which are stored in the motor controller, compensate for the torque difference due to different displacements of the cylinders,
wherein each of the plurality of control modes has a target displacement being different from each other, and the motor assist torque and the motor regenerative torque vary by changing the target displacement, and
wherein a variable displacement control is performed by changing the plurality of control modes.

12. The control method of claim 11, further comprising selecting a fixed mode function of selecting one from among the plurality of control modes and a variable mode function of adjusting the control modes before step (a).

13. The method of claim 11, wherein the interface controller stores information about a default mode, and in a case in which no control mode is selected or the selected control mode is released, transmits a command for switching to the default mode to the motor controller.

14. The method of claim 13, wherein the default mode is a mode for not driving the motor or controlling the motor to create a driving torque.

15. The method of claim 13, wherein the interface controller receives information about an SOC of a battery from a battery controller, and in a case in which the received information about the SOC of the battery is within a predetermined range or a command for releasing the selection of the control mode is received from the input, performs control of switching to the default mode.

16. The method of claim 12, wherein a non-uniform control option and a uniform control option are selected in the variable mode function.

17. The method of claim 16, wherein a bias amount of the regenerative torque or driving torque of the motor is set in the non-uniform control option.

18. The method of claim 16, wherein a power level of the engine and the motor is set in the uniform control option.

19. The method of claim 11, further comprising:
displaying the selected control mode through a display device before step (a); and
displaying at least one selected from the group consisting of the selected control mode, a SOC of a battery, a power level, a driving torque and the regenerative torque of the motor and information about uniform control or non-uniform control through the display device after step (a).

20. The method of claim 13, wherein the plurality of control modes comprise:
a first mode for controlling the motor such that energy regeneration is achieved in explosion strokes of high displacement cylinders and controlling the motor such that power assistance is achieved by motor torque in explosion strokes of low displacement cylinders;
a second mode for controlling the motor such that the motor is not driven in the explosion strokes of the high displacement cylinders and controlling the motor such that power assistance is achieved by motor torque in the explosion strokes of the low displacement cylinders; and
a third mode for controlling the motor such that energy regeneration is achieved in the explosion strokes of the high displacement cylinders and controlling the motor such that the motor is not driven in the explosion strokes of the low displacement cylinders.

* * * * *